US011216546B2

(12) United States Patent
Andersson et al.

(10) Patent No.: US 11,216,546 B2
(45) Date of Patent: Jan. 4, 2022

(54) METHOD FOR FINGERPRINT AUTHENTICATION USING FORCE VALUE

(71) Applicant: FINGERPRINT CARDS AB, Gothenburg (SE)

(72) Inventors: Markus Andersson, Staffanstorp (SE); Fredrik Norrman, Lund (SE); Erik Montnémery, Lund (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 147 days.

(21) Appl. No.: 16/605,073

(22) PCT Filed: Apr. 18, 2018

(86) PCT No.: PCT/SE2018/050391
§ 371 (c)(1),
(2) Date: Oct. 14, 2019

(87) PCT Pub. No.: WO2018/194506
PCT Pub. Date: Oct. 25, 2018

(65) Prior Publication Data
US 2020/0125710 A1    Apr. 23, 2020

(30) Foreign Application Priority Data
Apr. 19, 2017   (SE) .................................. 1750453-1

(51) Int. Cl.
*G06K 9/20*     (2006.01)
*G06K 9/62*     (2006.01)
(Continued)

(52) U.S. Cl.
CPC ........... *G06F 21/32* (2013.01); *G06K 9/0002* (2013.01); *G06K 9/00087* (2013.01); *G06K 9/00114* (2013.01); *G06K 9/00899* (2013.01)

(58) Field of Classification Search
CPC ............... G06F 21/32; G06K 9/00006–9/0012
See application file for complete search history.

(56) References Cited

U.S. PATENT DOCUMENTS

| | | | | |
|---|---|---|---|---|
| 9,032,511 B2* | 5/2015 | Morinaga | ............. | G06F 1/3287 726/19 |
| 2003/0068072 A1* | 4/2003 | Hamid | ................. | G06K 9/0002 382/124 |

(Continued)

FOREIGN PATENT DOCUMENTS

| | | |
|---|---|---|
| DE | 10153580 A1 | 5/2003 |
| EP | 2996068 A2 | 3/2016 |
| WO | 2017209677 A1 | 12/2017 |

OTHER PUBLICATIONS

PCT International Search Report and Written Opinion dated Jun. 12, 2018 for International Application No. PCT/SE2018/050391, 12 pages.

*Primary Examiner* — Brian Werner
(74) *Attorney, Agent, or Firm* — RMCK Law Group, PLC

(57) ABSTRACT

The present invention generally relates to a method for authenticating a user of an electronic device comprising a fingerprint sensor. The method comprises acquiring a sequence of verification images. Estimating, based on the images a first and a second verification force value indicative of a force applied by the object on the fingerprint sensor when the verification images were acquired. A verification image representation and a verification force value forms a verification template for each of the first and second images and forces. Matching the first and second verification template with at least one of a plurality of stored fingerprint enrolment templates in a respective first and second matching step. When the first and second matching steps each results in a positive match between the respective verifica- (Continued)

tion template and a respective one of the plurality of stored fingerprint enrolment templates, providing a signal indicating successful authentication of the user.

17 Claims, 7 Drawing Sheets

(51) Int. Cl.
*G06F 21/32* (2013.01)
*G06K 9/00* (2006.01)

(56) References Cited

U.S. PATENT DOCUMENTS

| | | |
|---|---|---|
| 2008/0166028 A1 | 7/2008 | Turek et al. |
| 2010/0027854 A1 | 2/2010 | Chatterjee et al. |
| 2010/0066697 A1 | 3/2010 | Jacomet et al. |
| 2017/0076132 A1 | 3/2017 | Sezan et al. |
| 2018/0238748 A1* | 8/2018 | Yang ................ G06K 9/00013 |

* cited by examiner

METHOD FOR FINGERPRINT AUTHENTICATION USING FORCE VALUE

CROSS-REFERENCE TO RELATED APPLICATIONS

This application is a 371 U.S. National Stage of International Application No. PCT/SE2018/050391, filed Apr. 18, 2018, which claims priority to Swedish Patent Application No. 1750453-1, filed Apr. 19, 2017. The disclosures of each of the above applications are incorporated herein by reference in their entirety

TECHNICAL FIELD

The present invention generally relates to a method for authenticating a user of an electronic device comprising a fingerprint sensor. The present invention further generally relates to a corresponding fingerprint sensing system and an electronic device.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

One of the problems associated with fingerprint sensors concerns so-called spoof fingers trying to mimic a live fingerprint to thereby deceive a fingerprint sensor. If fraud by the spoof finger is successful, unauthorized access to systems may undesirably be approved or unauthorized transactions may be granted which may lead to disastrous consequences. Furthermore, a spoof finger is relatively easy to produce which may eventually lead to an increasing number of fraud attempts, in particular as fingerprint sensors become more and more common as a means for authentication.

Thus, there is a need for improvement with regards the level of security related to authentication with fingerprint sensors.

SUMMARY OF THE INVENTION

In view of above-mentioned and other drawbacks of the prior art, it is an object of the present invention to provide a method for improved fingerprint authentication security. It is a further an object to provide a corresponding fingerprint sensor system.

According to an aspect of the present invention, it is therefore provided a method for authenticating a user of an electronic device comprising a fingerprint sensor, the method comprising the steps of: acquiring, using the fingerprint sensor, a sequence of verification images of an object; estimating, based on the sequence of images a first verification force value indicative of a force applied by the object on the fingerprint sensor when a first verification image in the sequence was acquired, and a second verification force value indicative of the force applied by the object on the fingerprint sensor when a second verification image in the sequence was acquired, wherein said first verification force value is different from said second verification force value, determining a first verification image representation based on the first verification image and a second verification image representation based on the second verification image, wherein the first verification image representation and the first verification force value forms a first verification template and the second verification image representation and the second verification force value forms a second verification template, matching the first verification template with at least one of a plurality of stored fingerprint enrolment templates in a first matching step, matching the second verification template with at least one of the plurality of stored fingerprint enrolment templates in a second matching step, each fingerprint enrolment template comprising an enrolment image representation based on an enrolment image of at least part of a user's finger and a corresponding enrolment force value indicative of the force applied by the user's finger on the fingerprint sensor when the corresponding enrolment image was acquired, wherein for a positive match the verification image representation and the verification force value of the same verification template is required to match the respective enrolment image representation and enrolment force value of the same fingerprint enrolment template, wherein, when the first matching step results in a positive match between the first verification template and one of the plurality of stored fingerprint enrolment templates, and the second matching step results in a positive match between the second verification template and another one of the plurality of stored fingerprint enrolment templates, providing a signal indicating successful authentication of the user.

The present invention is based upon the realization that fingerprints of live fingers deform depending on the force applied on the fingerprint sensor. It is thus realized that information related to the deformation can be utilized to improve the authentication security in fingerprint sensors. At different force values (e.g. at different applied forces), the verification image representation of a live fingerprint will differ, whereas for a spoof fingerprint, the verification image representation does not typically change much, or the spoof fingerprint does typically not change in the same way as the live fingerprint. For example, 3-dimensional spoof fingerprints (e.g. made from rubber, epoxy, or another material) deform insignificantly when exposed to a force (e.g. a force not breaking the spoof but within the boundaries for imaging). Furthermore, 2-dimensional spoofs such as photographs of photocopies do not deform (such that the spoof fingerprint deforms) at all when a force is applied on the spoof. The deformations of a fingerprint may relate to deformation of ridges, such as increase in width or depth, or split of ridges, or the appearance of a pore in the fingerprint image. For example, for a known user, the pores are located in known places on the finger. When a force is applied the pores tend to widen and stand out more clearly. Of course other deformations of a fingerprint are possible and the ones mentioned here are only for exemplary purposes.

Accordingly, the improvement in authentication is at least partly achieved by storing a force value together with the fingerprint enrolment image representation in the enrolment template. In other words, the enrolment templates each comprise an enrolment force value and an enrolment image representation. For a valid authentication, both the verification image representations obtained from at least two verification images and the corresponding verification forces must match the enrolment image representations and the enrolment force values in the same two enrolment templates.

Estimating the applied force based on the sequence of images may be performed in various ways. For example, a machine learning algorithm may be trained to classify images according to deformations in fingerprint features detected by comparing images in the sequence of images. Thus, starting from a first image in the sequence and comparing the second image in the sequence to the first image, deformations in the second image detected when compared to the first image may be used to determine a force value for the second image.

It should be noted that the force value is an estimated force value. The force value may be a force value indication expressed in "newton" but may equally well be expressed as e.g. "low force", "medium force", "high force", etc. Additionally, the force value is a relative force value. The sequence of images may for example comprise three images, where a first image may be used as a reference whereby the force value for a further image e.g. the second image is a relative force determined relative the first image. Similarly, the force value for the third image may is a relative force value determined relative the first image.

That the first verification force value is different from the second verification force value may be checked before continuing to the matching steps. For example, if it turns out that the first verification force value equals the second verification force value, a further image may be acquired and it is again checked that the verification force value estimated from the further image is different from e.g. the force estimated from the first verification image (or the second verification force). If the forces differ, then the method may continue with the first verification image and the first verification force value (or the second verification image and the second verification force value) and the further verification image and the further verification force value. If the further verification force value also equals the first and the second verification force value, another image is acquired until a verification force value that differs from the previous force values has been found.

In the context of the present application, the "enrolment image representation" and/or the "verification image representation" of a fingerprint image may be any information extracted from the fingerprint image, which is useful for assessing the similarity between fingerprint images acquired at different times. For instance, the enrolment/verification image representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized. Various ways of extracting such verification image representation or enrolment image representation from a fingerprint image are well-known to a person of ordinary skill in the relevant art.

In one embodiment of the invention, when a match is found between the first verification image representation and an enrolment image representation of the fingerprint enrolment template in the first matching step, comparing the first verification force value and the enrolment force value stored in the fingerprint enrolment template comprising the matching enrolment image representation, wherein, when the first verification force value is determined to not match the enrolment force value in the first matching step, providing a signal indicating unsuccessful authentication of the user. Hereby, when it is determined that the first verification force value is e.g. larger than the enrolment force value stored in the fingerprint enrolment template comprising the matching enrolment image representation, it may be determined that the object is a spoof finger. It is thus advantageously possible to classify the object as a spoof finger.

Advantageously, the verification force value and the enrolment force value may be used for indexing to e.g. enable a more efficient authentication procedure. In other words, the step of performing a fingerprint authentication procedure based on the first and the second verification templates and the plurality of fingerprint enrolment templates may comprise: matching the first (second) verification force value with the plurality of fingerprint enrolment templates, wherein when the first verification force value matches an enrolment force value of the fingerprint enrolment templates, matching the first (second) verification image representation with the enrolment image representations of the fingerprint enrolment templates comprising the matching enrolment force value. In other words, first the verification force value is matched with enrolment force values, when a match is found; it may be that several enrolment image representations were enrolled at the same enrolment force value. This may be the case for example when different partial fingerprint images of the fingerprint are acquired for enrolment. The verification image representation only needs to be compared with the enrolment image representations acquired at the enrolment image representation matching the verification force value. In other words, the authentication procedure can be performed significantly faster compared to if the first verification image representation has to be compared to all of the enrolled representations. The above also applies to the second verification template, in other words, matching the second verification force value with the plurality of fingerprint enrolment templates, wherein when the second verification force value matches another one of the enrolment force value of the fingerprint enrolment templates, matching the second verification image representation with the enrolment image representations of the fingerprint enrolment templates comprising the second enrolment force value.

Accordingly, it may advantageously be included to, when the first matching step results in a positive match, and when a match is found between the second verification force value and the enrolment force value of the fingerprint enrolment template in the second matching step, comparing the second verification image representation and the enrolment image verification in the fingerprint enrolment template comprising the matching enrolment force value in the second matching step, wherein, when the second verification image representation is determined to not match the enrolment image verification in the second matching step, providing a signal indicating unsuccessful authentication of the user.

In another possible embodiment, it may be included to, when the first matching step results in a positive match, and when a match is found between the second verification image representation and the enrolment image representation of the fingerprint enrolment template in the second matching step, comparing the second verification force value and the enrolment force value in the fingerprint enrolment template comprising the matching enrolment image representation in the second matching step, wherein, when the second verification force value is determined to not match the enrolment force value in the second matching step, providing a signal indicating unsuccessful authentication of the user.

When the verification image representation matches the enrolment image representation in the second verification step, but the corresponding forces do not match provides an even stronger indication that the object is a spoof finger. This is due to that the deformation of the spoof is likely not the same as for a real finger which is revealed in a two step verification procedure with two different forces applied on the fingerprint sensor.

In one embodiment there may be implemented to, when a signal indicating unsuccessful authentication of the user is provided, preventing access to an application using the electronic device. For example, the electronic device may be maintained locked so that the electronic device can not be accessed by a user trying to access the electronic device with a spoof finger, or access to performing a transaction or accessing files may be prevented.

According to another embodiment of the invention, the method may further comprise the step of: when a signal indicating unsuccessful authentication of the user is provided, and when the unsuccessful authentication is a result of a negative match in the second matching step or that the first enrolment force value does not match the enrolment force value in the first matching step, notifying, via electronic communication means, an owner of the electronic device that a spoof is attempting to access the electronic device.

The electronic communication means may for example be e-mail, SMS to another predefined phone number, or any internet based messaging service. The owner may be the person who is a registered user of the electronic device. For example, if the electronic device is a mobile phone, a laptop, tablet or desktop computer with email communication means, the account registered on the electronic device may be considered to be a reference to the owner. Furthermore, the owner may be required to enter additional contact information in the electronic device which is used in case of an unsuccessful authentication caused by a spoof finger attempt to unlock the electronic device.

According to another embodiment of the invention, when a signal is provided indicating successful authentication of the user, providing access to an application using the electronic device. Thus, the electronic device may be accessed, or access to performing a transaction or accessing files may be granted if a successful authentication is indicated.

According to a second aspect there is provided a fingerprint sensing system comprising a fingerprint sensor, the fingerprint sensing system being configured to: acquire, using the fingerprint sensor, a sequence of verification images of an object; estimate, based on the sequence of images a first verification force value indicative of a force applied by the object on the fingerprint sensor when a first verification image in the sequence was acquired, and a second verification force value indicative of the force applied by the object on the fingerprint sensor when a second verification image in the sequence was acquired, wherein said first verification force value is different from said second verification force value, determine a first verification image representation based on the first verification image and a second verification image representation based on the second verification image, wherein the first verification image representation and the first verification force value forms a first verification template and the second verification image representation and the second verification force value forms a second verification template, match the first verification template with at least one of a plurality of stored fingerprint enrolment templates in a first matching step, match the second verification template with at least one of the plurality of stored fingerprint enrolment templates in a second matching step, each fingerprint enrolment template comprising an enrolment image representation of at least part of a user's finger and a corresponding enrolment force value indicative of the force applied by the user's finger when the enrolment image representation was acquired, wherein for a positive match the verification image representation and the verification force value of the same verification template is required to match the respective enrolment image representation and enrolment force value of the same fingerprint enrolment template, wherein, when the first matching step results in a positive match between the first verification template and one of the plurality of stored fingerprint enrolment templates, and the second matching step results in a positive match between the second verification template and another one of the plurality of stored fingerprint enrolment templates, provide a signal indicating successful authentication of the user.

This second aspect of the invention provides similar advantages as discussed above in relation to the previous aspect of the invention.

According to a third aspect of the present invention, there is provided an electronic device, comprising: a fingerprint sensing system according to the previous aspect and a device controller for controlling the fingerprint sensing system to perform the steps the previous aspects, and for: providing an authentication request for the finger to the fingerprint sensing system; receiving the authentication signal from the fingerprint sensing system; and performing at least one action if the authentication signal indicates authentication success.

Accordingly, the fingerprint sensing system preferably forms part of an electronic device further comprising a device controller for performing an authentication of the finger based on the acquired verification fingerprint image and verification force value, and performing at least one action only if the authentication indicates an authentication success. Such an action may for example be for unlocking a locked portable device, e.g. in case the portable device is a mobile phone. The at least one action may of course be any type of action suitably used when there is a need to authenticate a finger.

In one embodiment of the invention, the control unit may be configured to when a match is found between the first verification image representation and an enrolment image representation of the fingerprint enrolment template in the first matching step, compare the first verification force value and the enrolment force value stored in the fingerprint enrolment template comprising the matching enrolment image representation, wherein, when the first verification force value is determined to not match the enrolment force value in the first matching step, provide a signal indicating unsuccessful authentication of the user.

In one embodiment of the invention, the device controller may be configured to, when the first matching step results in a positive match, and when a match is found between the second verification force value and the enrolment force value of the fingerprint enrolment template in the second matching step, compare the second verification image representation and the enrolment image verification in the fingerprint enrolment template comprising the matching enrolment force value in the second matching step, wherein, when the second verification image representation is determined to not match the enrolment image verification in the second matching step, provide a signal indicating unsuccessful authentication of the user.

In one embodiment of the invention, the device controller may be configured to, when the first matching step results in a positive match, and when a match is found between the second verification image representation and the enrolment image representation of the fingerprint enrolment template in the second matching step, compare the second verification force value and the enrolment force value in the fingerprint enrolment template comprising the matching enrolment image representation in the second matching step, wherein, when the second verification force value is determined to not match the enrolment force value in the second matching step, provide a signal indicating unsuccessful authentication of the user.

In one embodiment of the invention, the device controller may be configured to notify, via electronic communication means, the owner of the electronic device that a spoof is attempting to access an application using the electronic device.

In another embodiment of the invention, the device controller may be configured to grant access to an application using the electronic device in response to the signal indicating successful authentication of the user.

This third aspect of the invention provides similar advantages as discussed above in relation to the previous aspect of the invention.

The fingerprint sensor may be implemented using any kind of current or future fingerprint sensing principle, including for example capacitive, optical, or thermal sensing technology. However, at present capacitive sensing is most preferred. With a capacitive fingerprint sensor, a measure is detected indicative of the capacitive coupling between each sensing element in an array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint. Both one and two-dimensional sensors are possible and within the scope of the invention. Furthermore, the electronic device may advantageously be a mobile phone. However, other electronic devices are of course thinkable such as tablets, laptops desktop computers, smart cards, etc.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "control unit" should be understood to include any type of computing device, such as an ASIC, a micro-processor, etc. It should also be understood that the actual implementation of such a control unit may be divided between a plurality of devices/circuits.

According to a further aspect of the present invention, there is provided a computer program product comprising a computer readable medium having stored thereon computer program means for controlling an electronic device, the electronic device comprising a device controller, and a fingerprint sensor, wherein the computer program product comprises: code for acquiring, using the fingerprint sensor, a sequence of verification images of an object; code for estimating, based on the sequence of images a first verification force value indicative of a force applied by the object on the fingerprint sensor when a first verification image in the sequence was acquired, and a second verification force value indicative of the force applied by the object on the fingerprint sensor when a second verification image in the sequence was acquired, wherein said first verification force value is different from said second verification force value, code for determining a first verification image representation based on the first verification image and a second verification image representation based on the second verification image, wherein the first verification image representation and the first verification force value forms a first verification template and the second verification image representation and the second verification force value forms a second verification template, code for matching the first verification template with at least one of a plurality of stored fingerprint enrolment templates in a first matching step, code for matching the second verification template with at least one of the plurality of stored fingerprint enrolment templates in a second matching step, each fingerprint enrolment template comprising an enrolment image representation based on an enrolment image of at least part of a user's finger and a corresponding enrolment force value indicative of the force applied by the user's finger on the fingerprint sensor when the enrolment image was acquired, wherein for a positive match the verification image representation and the verification force value of the same verification template is required to match the respective enrolment image representation and enrolment force value of the same fingerprint enrolment template, wherein, when the first matching step results in a positive match between the first verification template and one of the plurality of stored fingerprint enrolment templates, and the second matching step results in a positive match between the second verification template and another one of the plurality of stored fingerprint enrolment templates, code for providing a signal indicating successful authentication of the user.

In summary, the present invention generally relates to a method for authenticating a user of an electronic device comprising a fingerprint sensor. The method comprises to acquire a sequence of verification images. Estimating, based on the images a first and a second verification force value indicative of a force applied by the object on the fingerprint sensor when the verification images were acquired. A verification image representation and a verification force value forms a verification template for each of the first and second images and forces. Matching the first and second verification template with at least one of a plurality of stored fingerprint enrolment templates in a respective first and second matching step. When the first and second matching steps each results in a positive match between the respective verification template and a respective one of the plurality of stored fingerprint enrolment templates, providing a signal indicating successful authentication of the user.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
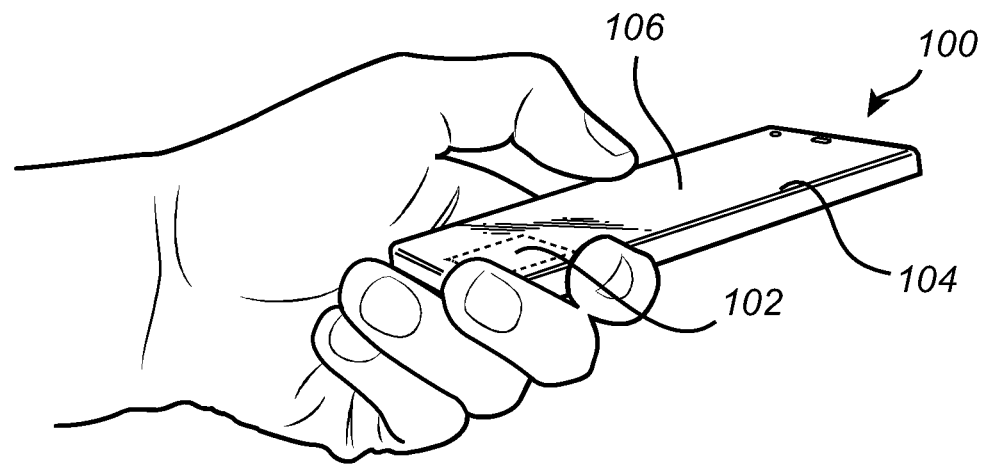
FIGS. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside or on the side of the mobile phone 100. The fingerprint sensor 102 is part of a fingerprint sensing system.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, smart card or any other type of present or future similarly configured device.

Figure 2:
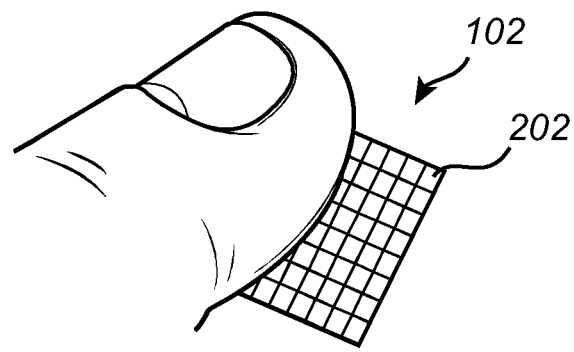
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3:
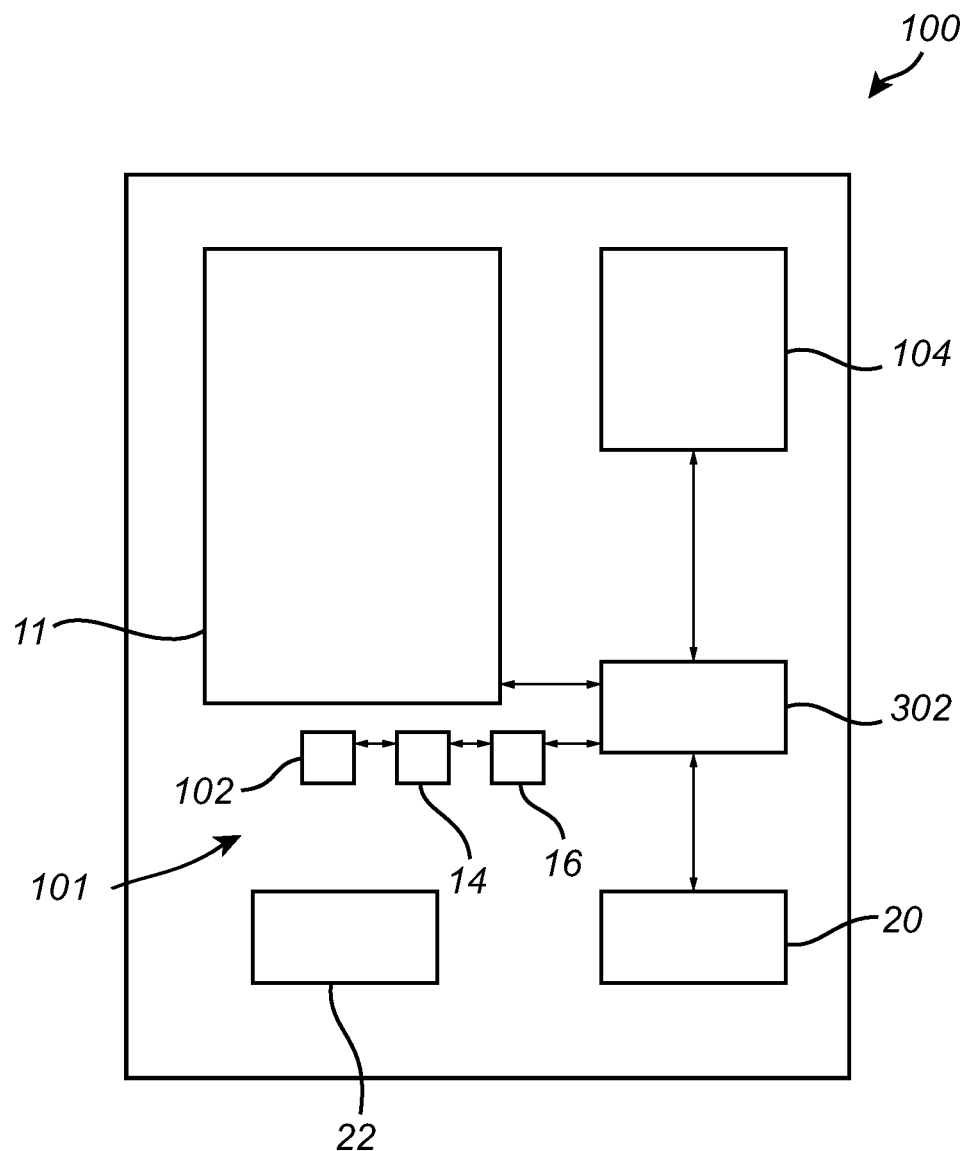
FIG. 3 conceptually shows an electronic device comprising a fingerprint sensing system according to an embodiment of the invention.

FIG. 3 schematically illustrates an electronic device 100 comprising a device controller 302 and the fingerprint sensor 102. The device controller is integrated in the electronic device 100. However, likewise a control unit can be integrated with the fingerprint sensing system comprising the fingerprint sensor 102. The device controller 302 is configured to control the fingerprint sensor 102 to acquire fingerprint images from which force values can be estimated. The force values and the fingerprint images is thus acquired and read by the device controller 302. Furthermore, the device controller 302 may provide signals to control circuitry of the electronic device for unlocking of locking the electronic device to thereby allow access or not to the electronic device depending on the outcome of an authentication procedure. Applications run via the electronic device may also make use of the authentication procedure, for example, transactions may be granted/denied or access to files may be granted/denied depending on the outcome of the authentication procedure. The electronic device 100 further comprises, in addition to the fingerprint sensor 102, a touch sensor 11 a display 104, fingerprint image acquisition circuitry 14, image processing circuitry 16, a memory 20, and a battery 22 for providing electrical energy to the various components of the electronic device 1. The fingerprint sensing system 101 may comprise processing circuitry to perform the steps illustrated in FIGS. 6 and 7, or the device controller 302 may be arranged to control the fingerprint sensing system accordingly.

The device controller (and the optional control unit of the fingerprint sensing system) may include circuitry for converting analog signals to digital signals. Such circuitry may include at least one analog to digital converter circuit. In such embodiments, the fingerprint sensing system may thus provide a fingerprint pattern signal as a digital signal and a force value signal as a digital signal.

Figure 4:
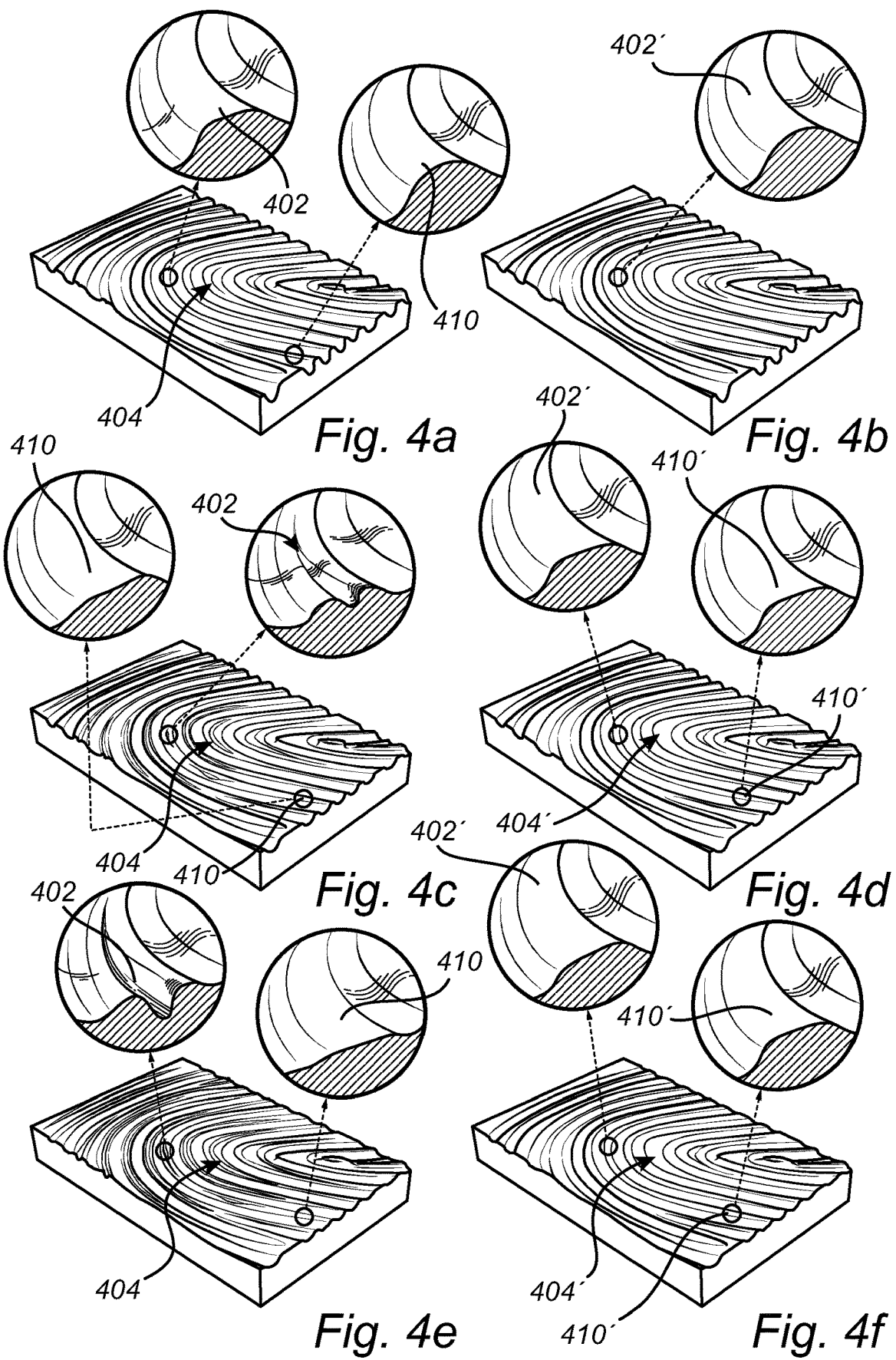
FIGS. 4a-4f conceptually show fingerprint images acquired from a live finger (FIGS. 4a, c, e) and from a spoof finger (FIGS. 4b, d, f), at different applied force on the fingerprint sensor.

FIG. 4a-f conceptually shows fingerprint topologies from a living finger (FIGS. 4a, c, e) and from a spoof finger (FIGS. 4b, d, f), at different applied pressure/force on the fingerprint sensor. Generally, a spoof finger is intended to mimic the fingerprint of the living finger. FIG. 4a shows a fingerprint topology of a living finger at "low" force applied on the fingerprint sensor and FIG. 4b shows the topology of the spoof finger when the same or similar "low" force is applied by the spoof finger on the fingerprint sensor. The fingerprint topology in FIG. 4a is similar to the spoof finger fingerprint in FIG. 4b. In FIG. 4a there is indicated a ridge 402 and a ridge 410 in close-up views. In FIG. 4b there is indicated a ridge 402' in the spoof fingerprint corresponding to the ridge 402 in the live fingerprint in FIG. 4a.

Turning now to FIGS. 4c-d, there is conceptually shown a living finger fingerprint image in FIG. 4c at "normal" force (e.g. about 0.3 N-0.8 N) applied on the fingerprint sensor and in FIG. 4d there is shown a spoof finger fingerprint topology acquired by the fingerprint sensor at the same or similar "normal" force. The difference between the spoof finger fingerprint topology in FIG. 4b and the spoof finger fingerprint topology in FIG. 4d is not substantial, or even close to non-existing. In the living finger fingerprint images shown in FIG. 4a and FIG. 4c, however there is some difference in the topologies. For example, as shown in FIG. 4c, two ridges 402, 404 in the living finger fingerprint are somewhat split as compared to the same ridges 402, 404 in FIG. 4a (only ridge 402 shown in expanded view). Thus, depending on the force applied on the fingerprint sensor when the fingerprint image was acquired, the fingerprint image is different, thereby also the fingerprint verification image representation. Furthermore, as previously mentioned, the difference in the spoof finger fingerprint images (FIG. 4b and FIG. 4d) does not correspond to the difference between the live finger fingerprint topologies (FIG. 4a and FIG. 4c). For example, the ridges 402' and 404' have not split when the "normal" force is applied (FIG. 4b) as compared to when the "low" force is applied (FIG. 4b). Therefore, it is possible to determine a difference in the live finger fingerprint topology shown in FIG. 4c and the spoof finger fingerprint topology shown in FIG. 4d, both at the same "normal" force applied on the fingerprint sensor, by comparing e.g. the live finger fingerprint ridges 402, 404 with the spoof finger fingerprint ridges 402', 404'.

Turning now to FIGS. 4e-f, there is shown a live finger fingerprint topology in FIG. 4e at "high" force applied on the fingerprint sensor and in FIG. 4f there is shown a spoof finger fingerprint topology acquired by the fingerprint sensor at the same or similar "high" force. Firstly, comparing the ridges 402, 404 from FIG. 4c acquired at the "normal" force which is lower than the "high" force, the ridges 402, 404 have split further (a split may be due to presence of a pore). As a further example, there can be noticed a deformation (e.g. a compression) of the ridge 410 in FIG. 4e ("high" force) compared to the same ridge 410 in FIG. 4c ("normal" force) and in FIG. 4a ("low" force). Secondly, comparing the ridges 402', 404' of the spoof finger fingerprint in FIG. 4f at "high" force with the same ridges 402', 404', of the spoof finger fingerprint in FIG. 4d at "normal" force, there is no deformation or close to no deformation. In particular there is no splitting of the ridges 402', 404', in the spoof finger fingerprint image acquired at "high" force. Furthermore, the ridge 410' in FIG. 4f, does not change significantly depending on the applied force/pressure going from "normal" force (FIG. 4d) to "high" force (FIG. 4f). However, the deformation of the corresponding ridge 410 is substantially deformed (i.e. compressed) in the live fingerprint going from "normal" force (FIG. 4c) to "high" force (FIG. 4e).

Figure 5:
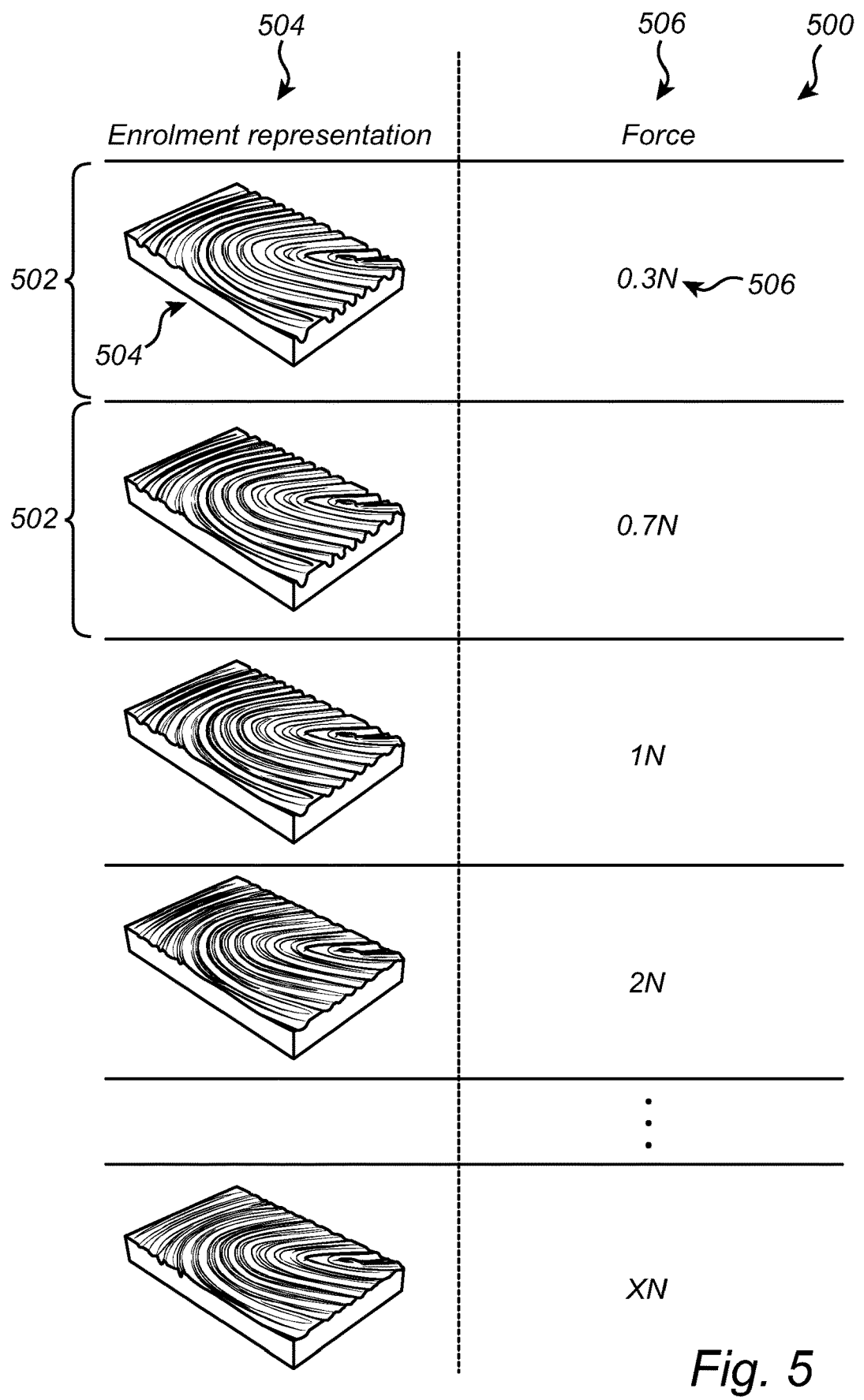
FIG. 5 conceptually illustrates fingerprint enrolment templates.

FIG. 5 conceptually illustrates a plurality of fingerprint enrolment templates 500 according to embodiments of the invention. A single fingerprint enrolment template is denoted 502 (not all are numbered). Each fingerprint enrolment template 502 comprises an enrolment image representation 504 of a user's finger and an enrolment force value 506 indicative of the force applied by the user's finger when the corresponding enrolment image representation 504 was acquired. The enrolment image representation as shown in FIG. 5 is a conceptual view and not the actual enrolment image representation.

It should be noted that although the plurality of fingerprint enrolment templates 500 in FIG. 5 are shown as a single two column table, there may be multiple enrolment image representations for a single force. For example, there may be enrolment image representations from different areas of the user's finger which have been enrolled with the same force. Or there may be different types of enrolment image representations for a single force, e.g. different minutiae, or binarized and/or skeletonized images. It may be advantageous to first determine the verification force value indicative of a force applied by the object on the fingerprint sensor. Thereafter, based on the determined verification force value, choose the correct subset of enrolment image representations corresponding to the determined force value. Acquiring, a first verification image of the object and determine a first verification image representation from the first verification image. For fingerprint authentication, the first and/or second verification image representation now only has to be matched with the subset of enrolment image representations corresponding to the respective verification force value. In other words, the authentication procedure can be performed significantly faster compared to if the first and/or second verification image representation has to be compared to all of the enrolled representations. For example, if the verification force value is indicative of 0.7 N or a "normal force", then the control unit matches the verification image representation with enrolment image representations having been enrolled at 0.7 N or a "normal force", i.e. enrolment image representations with a respective enrolment force value of 0.7 N.

Figure 6:
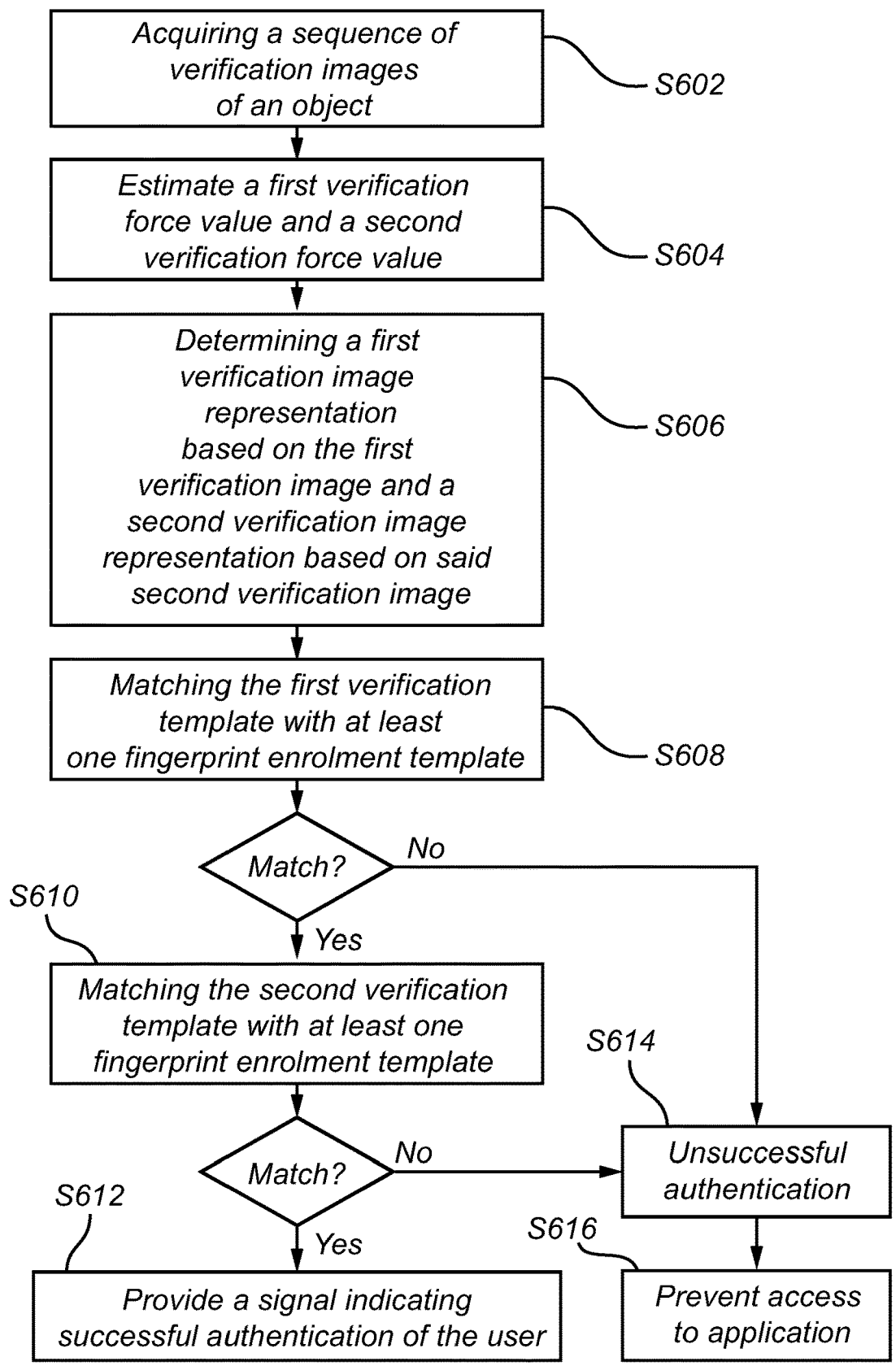
FIG. 6 is a flow-chart of method steps according to an embodiment of the invention.

Now with reference to FIG. 6 showing a flow-chart of method steps according to an embodiment of the invention. In a first step S602 a sequence of verification images of an object is acquired using a fingerprint sensor. Next, in step S604, a first verification force value is estimated indicative of a force applied by the object on the fingerprint sensor when a first verification image in the sequence was acquired. In addition, a second verification force value is estimated indicative of the force applied by the object on the fingerprint sensor when a second verification image in the sequence was acquired.

The first verification force value is made sure to be different from the second verification force value in an iterative way by taking additional images, estimating the force based on the image and comparing the force estimated from the additional image, if the force estimated from the additional image different from the first verification force value, the method proceeds, otherwise another image is acquired and so on.

In subsequent step S606, a first verification image representation is determined based on the first verification image and a second verification image representation is determined based on the second verification image. The first verification image representation and the first verification force value forms a first verification template and the second verification image representation and the second verification force value forms a second verification template. The first verification template is matched in step S608 with at least one stored enrolment template.

For a positive match, the verification image representation and the verification force value of the same verification template is required to match the respective enrolment image representation and enrolment force value of the same fingerprint enrolment template. Consequently, during a fingerprint authentication procedure, it is determined whether each of the first verification image representation and the first verification force value comprised in the first verification template matches each of the enrolment image representation and the enrolment force value comprised in the same first fingerprint enrolment template. Each enrolment template comprises a verification image representation of at least a part of a user's finger and an enrolment force value indicative of the force applied (e.g. 1 N, 2 N, etc., or "low force", "normal force", "high force") when the respective enrolment image representation was acquired (or when the enrolment image was acquired from which the enrolment image representation was determined). If a match is found, the second verification template is matched S610 with at least one stored enrolment template. If there is match also in step S610, a signal is provided in step S612 indicating successful authentication of the user. In one embodiment, the electronic device is configured to grant access to an application in response to a signal provided that indicates successful authentication of the user.

However, if it is determined in any of steps S608 or S610 that no match can be found, unsuccessful authentication in step S614 is the outcome of the authentication procedure. During matching, the force value may be used as an index to match the verification image representation with an enrolment image representation with matching force values, thus the unsuccessful authentication is in such case due to a verification image representation not matching the enrolment image representation with the same force values. If unsuccessful authentication is the outcome, the electronic device may be prevented from granting access to an application in step S616. For example, if the electronic device was already unlocked, the electronic device may be locked in response to the unsuccessful authentication.

In such case an owner of the electronic device which the object is trying to access may be notified via electronic means of a fraud attempt to access the electronic device.

Although it is here described to match a first verification template with a plurality of enrolment templates and a second verification template with the plurality of enrolment templates, it may be included to match further verification templates with the plurality of enrolment templates, e.g. a third, fourth, etc. for improved security and spoof detection capability. In other words, a third verification force value is estimated indicative of the force applied by the object on the fingerprint sensor when a third verification image in the sequence was acquired. Subsequently a third verification image representation is determined. The third verification force value is different from the first and the second verification force values. In this case, a third matching step is performed where a third verification template comprising the third verification force and the third verification image representation is matched with the plurality of enrolment templates. For successful authentication, the third matching step must also be a positive match.

Figure 7:
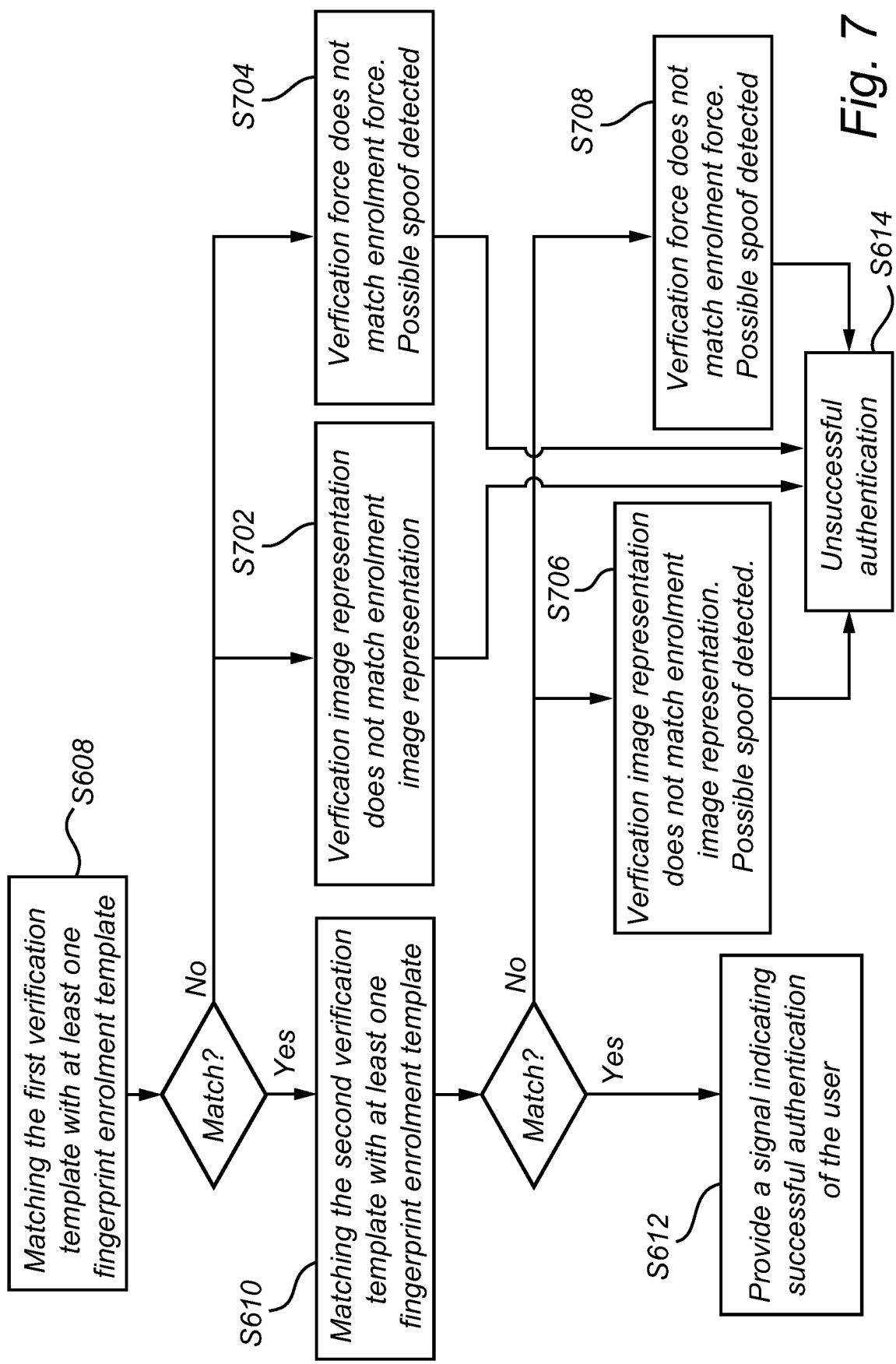
FIG. 7 is a flow-chart of method steps according to an embodiment of the invention.

In FIG. 7 additional further embodiments are shown in a flow-chart. If it is in step S608, determined that the first verification template does not match a fingerprint enrolment template, this could be due to that the first verification image representation does not match an enrolment image representation (S702) which thus means that the fingerprint was not found in the database. In other words, either the user is not authorized or the finger is poorly placed.

Another possibility (S704) is that the first verification image representation matches a fingerprint enrolment image representation but the first verification force value does not match the enrolment force corresponding to the matching fingerprint enrolment image representation. This scenario is an indication that the object is a spoof since the verification fingerprint matches an enrolled fingerprint but at a non-matching force, e.g. the deformation of the fingerprint does not behave as the real enrolled fingerprint. Both cases S702 and S704 lead to unsuccessful authentication S614.

With further reference to FIG. 7, if it is in step S610, determined that the second verification template does not match a fingerprint enrolment template, this could be due to that the second verification image representation does not match the enrolment image representation which thus means that the fingerprint was not found in the database. In other words, either the user is not authorized or the finger is poorly placed, or a spoof is detected. That a spoof is detected here in step S706 is due to that the fingerprint deformation is not the same for a spoof as for a real finger. Thus, the second verification force value may match an enrolment force value but the second verification image representation does not match the enrolment image representation corresponding to the matching enrolment force value. In step S706, a spoof is detected with higher probability than in step S704 since if the authentication procedure has passed step S608, then a user has been identified, but the second verification image representation does not match. In other words, an object managed to fraud the authentication with the first verification image representation and first verification force but the spoof deformation did not coincide with the true fingerprint.

Another possibility (S708) is that second verification image representation matches a fingerprint enrolment image representation at the same time as the second verification force does not match the enrolment force value corresponding to the matching fingerprint enrolment image representation. This scenario is also an indication that the object is a spoof since the verification fingerprint matches an enrolled fingerprint but at the wrong applied force, e.g. the deformation of the fingerprint does not appear in the same way as the live enrolled fingerprint. Both cases S706 and S708 lead to unsuccessful authentication S614.

Estimating the applied force based on the sequence of images may be performed in various ways. For example, a machine learning algorithm may be trained to classify images according to deformations in fingerprint features detected by comparing images in the sequence of images, see for example the conceptual images in FIGS. 4a,d,e illustrating fingerprint deformations for different applied force. Thus, starting from a first image (e.g. FIG. 4a) in the sequence and comparing the second image (e.g. FIG. 4c) in the sequence to the first image, deformations in the second image detected when compared to the first image may be used to determine a force value.

In one example implementation the ridge width (see for example the conceptual images in FIGS. 4a,d,e) may be used to estimate the applied force. For example, in a first acquired image, a first ridge width may be detected and is associated with a first force value and in a second image a second ridge width may be associated with a second force value. Furthermore, combination of e.g. ridge and valley deformations may of course also be used for estimating a force value. It should further be noted that the force value does not have to be the actual force (e.g. in Newton) but may be a value indicative of the force or even a notation (e.g. "low", "normal", "high") indicative of the force as long as it is possible to identify which force is the higher and lower force.

Figures 8A, 8B, 8C:
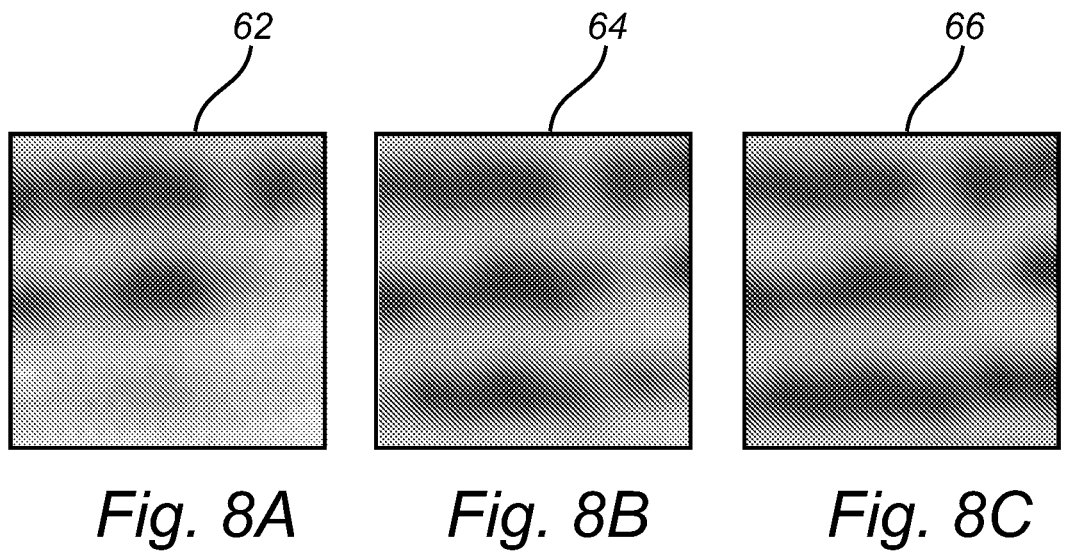
FIG. 8a-8c conceptually illustrates at least partial fingerprint images for estimating a force value.

FIGS. 8A-C schematically show three different fingerprint images 62, 64, and 66 in a sequence of fingerprint images.

In the example of FIGS. 8A-C, the ridges of the fingerprint topography initially make point contact. With increasing finger force on the sensor surface, the points grow to lines, which eventually meet to form continuous ridges. In the process of the points growing to lines, it has been found that the intensity range (maximum intensity−minimum intensity in the image) grows between successive fingerprint images.

Accordingly, the development of fingerprint ridge/valley deformation patterns in the sequence of images may be used for estimating the force value. It may for example, in accordance with the above FIGS. 8A-C, be possible to analyze histograms of pixel values from the images in the sequence of images. In this case, it may be possible to estimate a force values or at least an indication whether the image is acquired at a high force or a low force by determining a "higher" image intensity and a "lower" image intensity from a first fingerprint image, subsequently, determining a "higher" image intensity and a "lower" image intensity from a second fingerprint image. It is then possible to determine a first intensity range from the difference between the higher intensity and the lower intensity in the first image, and a second intensity range from the difference between the higher intensity and the lower intensity in the second image. The force applied in the fingerprint sensor may be based on e.g. a difference between the higher intensities in each image, and/or a difference between the first intensity range and the second intensity range.

Another possible way of detecting the development of fingerprint deformation may be to detect the number of ridges detected in the image, i.e. the number of ridges is an indication of the force applied on the sensor.

Accordingly, the above discussion reflects various ways of estimating a force value from a sequence of fingerprint images.

The device controller and/or control unit may each include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "control circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for authenticating a user of an electronic device comprising a fingerprint sensor, the method comprising the steps of:
    acquiring, using the fingerprint sensor, a sequence of verification images of an object;
    estimating, based on said sequence of images a first verification force value indicative of a force applied by the object on the fingerprint sensor when a first verification image in the sequence was acquired, and
    a second verification force value indicative of the force applied by the object on the fingerprint sensor when a second verification image in the sequence was acquired, wherein said first verification force value is different from said second verification force value,
    determining a first verification image representation based on said first verification image and a second verification image representation based on said second verification image, wherein
    said first verification image representation and said first verification force value forms a first verification template and said second verification image representation and said second verification force value forms a second verification template,
    matching said first verification template with at least one of a plurality of stored fingerprint enrolment templates in a first matching step,
    matching said second verification template with at least one of said plurality of stored fingerprint enrolment templates in a second matching step,
    each fingerprint enrolment template comprising an enrolment image representation based on an enrolment image of at least part of a user's finger and a corresponding enrolment force value indicative of the force applied by the user's finger on the fingerprint sensor when the corresponding enrolment image was acquired,
    wherein for a positive match the verification image representation and the verification force value of the same verification template is required to match the respective enrolment image representation and enrolment force value of the same fingerprint enrolment template,
    wherein, when said first matching step results in a positive match between said first verification template and one of said plurality of stored fingerprint enrolment templates, and
    said second matching step results in a positive match between said second verification template and another one of said plurality of stored fingerprint enrolment templates,
    providing a signal indicating successful authentication of the user.

2. The method according to claim 1, wherein when a match is found between the first verification image representation and an enrolment image representation of said fingerprint enrolment template in said first matching step, comparing the first verification force value and the enrolment force value stored in the fingerprint enrolment template comprising the matching enrolment image representation, wherein,
when the first verification force value is determined to not match the enrolment force value in the first matching step, providing a signal indicating unsuccessful authentication of the user.

3. The method according to claim 1, wherein when said first matching step results in a positive match, and when a match is found between the second verification force value and the enrolment force value of said fingerprint enrolment template in said second matching step,
comparing the second verification image representation and the enrolment image verification in the fingerprint enrolment template comprising the matching enrolment force value in the second matching step, wherein,
when the second verification image representation is determined to not match the enrolment image verification in said second matching step, providing a signal indicating unsuccessful authentication of the user.

4. The method according to claim 1, wherein when said first matching step results in a positive match, and when a match is found between the second verification image representation and the enrolment image representation of said fingerprint enrolment template in the second matching step,
comparing the second verification force value and the enrolment force value in the fingerprint enrolment template comprising the matching enrolment image representation in said second matching step, wherein,
when the second verification force value is determined to not match the enrolment force value in said second matching step, providing a signal indicating unsuccessful authentication of the user.

5. The method according to claim 1, further comprising the step of:
when a signal indicating unsuccessful authentication of the user is provided, preventing access to an application using said electronic device.

6. The method according to claim 1, further comprising the step of:
when a signal indicating unsuccessful authentication of the user is provided, and
when said unsuccessful authentication is a result of a negative match in said second matching step or that the first enrolment force value does not match the enrolment force value in the first matching step,
notifying, via electronic communication means, an owner of the electronic device that a spoof is attempting to access the electronic device.

7. The method according to claim 1, further comprising the step of:
when a signal is provided indicating successful authentication of the user, providing access to an application using the electronic device.

8. A fingerprint sensing system comprising a fingerprint sensor, said fingerprint sensing system being configured to:
acquire, using the fingerprint sensor, a sequence of verification images of an object;
estimate, based on said sequence of images a first verification force value indicative of a force applied by the object on the fingerprint sensor when a first verification image in the sequence was acquired, and
a second verification force value indicative of the force applied by the object on the fingerprint sensor when a second verification image in the sequence was acquired, wherein said first verification force value is different from said second verification force value,
determine a first verification image representation based on said first verification image and a second verification image representation based on said second verification image, wherein
said first verification image representation and said first verification force value forms a first verification template and said second verification image representation and said second verification force value forms a second verification template,
match said first verification template with at least one of a plurality of stored fingerprint enrolment templates in a first matching step,
match said second verification template with at least one of said plurality of stored fingerprint enrolment templates in a second matching step,
each fingerprint enrolment template comprising an enrolment image representation of at least part of a user's finger and a corresponding enrolment force value indicative of the force applied by the user's finger when said enrolment image representation was acquired,
wherein for a positive match the verification image representation and the verification force value of the same verification template is required to match the respective enrolment image representation and enrolment force value of the same fingerprint enrolment template,
wherein, when said first matching step results in a positive match between said first verification template and one of said plurality of stored fingerprint enrolment templates, and
said second matching step results in a positive match between said second verification template and another one of said plurality of stored fingerprint enrolment templates,
provide a signal indicating successful authentication of the user.

9. An electronic device, comprising:
a fingerprint sensing system according to claim 8, and a device controller for controlling the fingerprint sensing system to perform the steps of claim 8, and for:
providing an authentication request for said finger to the fingerprint sensing system;
receiving said authentication signal from the fingerprint sensing system; and
performing at least one action if said authentication signal indicates authentication success.

10. The electronic device according to claim 9, wherein the device controller is configured to, when a match is found between the first verification image representation and an enrolment image representation of said fingerprint enrolment template in said first matching step,
compare the first verification force value and the enrolment force value stored in the fingerprint enrolment template comprising the matching enrolment image representation, wherein,
when the first verification force value is determined to not match the enrolment force value in the first matching step, provide a signal indicating unsuccessful authentication of the user.

11. The electronic device according to claim 9, wherein the device controller is configured to, when said first matching step results in a positive match, and when a match is found between the second verification force value and the enrolment force value of said fingerprint enrolment template in said second matching step, compare the second verification image representation and the enrolment image verification in the fingerprint enrolment template comprising the matching enrolment force value in the second matching step, wherein,
when the second verification image representation is determined to not match the enrolment image verification in said second matching step, provide a signal indicating unsuccessful authentication of the user.

12. The electronic device according to claim 9, wherein the device controller is configured to, when said first matching step results in a positive match, and when a match is found between the second verification image representation and the enrolment image representation of said fingerprint enrolment template in the second matching step,
compare the second verification force value and the enrolment force value in the fingerprint enrolment template comprising the matching enrolment image representation in said second matching step, wherein,
when the second verification force value is determined to not match the enrolment force value in said second matching step, provide a signal indicating unsuccessful authentication of the user.

13. The electronic device according to claim 10, wherein the device controller is configured to notify, via electronic communication means, the owner of the electronic device that a spoof is attempting to access an application using the electronic device.

14. The electronic device according to claim 9, wherein the device controller is configured to grant access to an application using the electronic device in response to said signal indicating successful authentication of the user.

15. The electronic device according to claim 9, wherein the fingerprint sensor is a capacitive fingerprint sensor.

16. The electronic device according to claim 9, wherein the electronic device is a mobile phone.

17. A computer program product comprising a non-transitory computer readable medium having stored thereon computer program means for controlling an electronic device, the electronic device comprising a device controller, and a fingerprint sensor, wherein the computer program product comprises:
code for acquiring, using the fingerprint sensor, a sequence of verification images of an object;
code for estimating, based on said sequence of images a first verification force value indicative of a force applied by the object on the fingerprint sensor when a first verification image in the sequence was acquired, and
a second verification force value indicative of the force applied by the object on the fingerprint sensor when a second verification image in the sequence was acquired, wherein said first verification force value is different from said second verification force value,
code for determining a first verification image representation based on said first verification image and a second verification image representation based on said second verification image, wherein
said first verification image representation and said first verification force value forms a first verification template and said second verification image representation and said second verification force value forms a second verification template,
code for matching said first verification template with at least one of a plurality of stored fingerprint enrolment templates in a first matching step,
code for matching said second verification template with at least one of said plurality of stored fingerprint enrolment templates in a second matching step,
each fingerprint enrolment template comprising an enrolment image representation based on an enrolment image of at least part of a user's finger and a corresponding enrolment force value indicative of the force applied by the user's finger on the fingerprint sensor when said enrolment image was acquired,
wherein for a positive match the verification image representation and the verification force value of the same verification template is required to match the respective enrolment image representation and enrolment force value of the same fingerprint enrolment template,
wherein, when said first matching step results in a positive match between said first verification template and one of said plurality of stored fingerprint enrolment templates, and
said second matching step results in a positive match between said second verification template and another one of said plurality of stored fingerprint enrolment templates,
code for providing a signal indicating successful authentication of the user.

* * * * *